US011511320B2

(12) United States Patent
Sakai

(10) Patent No.: US 11,511,320 B2
(45) Date of Patent: Nov. 29, 2022

(54) SURFACE FINISHING APPARATUS

(71) Applicant: FANUC CORPORATION, Yamanashi (JP)

(72) Inventor: Tamotsu Sakai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 233 days.

(21) Appl. No.: 17/064,002

(22) Filed: Oct. 6, 2020

(65) Prior Publication Data

US 2021/0101183 A1 Apr. 8, 2021

(30) Foreign Application Priority Data

Oct. 8, 2019 (JP) .............................. JP2019-185272

(51) Int. Cl.
*B25J 9/16* (2006.01)
*B25J 13/08* (2006.01)
*B08B 1/00* (2006.01)

(52) U.S. Cl.
CPC ............. *B08B 1/005* (2013.01); *B25J 9/1697* (2013.01); *B25J 13/085* (2013.01)

(58) Field of Classification Search
CPC ....... B08B 1/005; B25J 9/1697; B25J 13/085; B25J 9/1633; B25J 11/005; B25J 19/023; G05B 2219/39529; G05B 2219/40607
USPC ................. 700/245–264; 318/568.11–568.25
See application file for complete search history.

(56) References Cited

U.S. PATENT DOCUMENTS

| | | | | |
|---|---|---|---|---|
| 4,337,566 A | * | 7/1982 | DiMatteo | B44C 1/22 901/29 |
| 4,355,447 A | * | 10/1982 | DiMatteo | B23Q 35/06 901/41 |
| 4,664,514 A | * | 5/1987 | Corby, Jr. | G01N 21/91 356/237.2 |
| 4,864,777 A | * | 9/1989 | McLaughlin | B24B 49/12 451/6 |
| 5,031,483 A | * | 7/1991 | Weaver | B29C 33/302 451/5 |
| 5,077,941 A | * | 1/1992 | Whitney | B24B 49/16 451/6 |

(Continued)

FOREIGN PATENT DOCUMENTS

EP 3372342 A1 9/2018
JP S6097226 U 7/1985

(Continued)

*Primary Examiner* — Jaime Figueroa
(74) *Attorney, Agent, or Firm* — Karceski IP Law, PLLC

(57) ABSTRACT

A surface finishing apparatus includes: an arm to which a tool is attached; a force sensor that detects force applied to the tool; a visual sensor acquiring an image of a plane surface; a storage device storing data indicating a target state of the plane surface; and a controller that performs removing position determination process for determining, by using at least unfinished-surface image data and the data indicating the target state, a plurality of removing positions on the plane surface of the member, and arm control process for controlling the arm to sequentially perform surface removal at the plurality of determined removing positions, wherein a surface inspection agent is applied to the plane surface whose image is to be acquired by the visual sensor, and thereby the surface inspection agent is distributed over the plane surface.

7 Claims, 7 Drawing Sheets

(56) References Cited

U.S. PATENT DOCUMENTS

| | | | | |
|---|---|---|---|---|
| 5,091,861 | A * | 2/1992 | Geller | B23C 9/005 700/192 |
| 5,448,146 | A * | 9/1995 | Erlbacher | G05B 19/182 318/568.17 |
| 5,456,798 | A * | 10/1995 | Koumura | G02B 3/00 216/66 |
| 5,814,959 | A * | 9/1998 | Nonaka | B25J 9/1633 318/568.22 |
| 5,871,391 | A * | 2/1999 | Pryor | F02F 1/24 356/600 |
| 5,917,726 | A * | 6/1999 | Pryor | G05B 19/41875 700/95 |
| 6,102,777 | A * | 8/2000 | Duescher | B24B 41/061 451/36 |
| 6,745,108 | B1 * | 6/2004 | McGuire | B25J 21/00 700/291 |
| 6,940,037 | B1 * | 9/2005 | Kovacevic | B23K 26/144 219/121.45 |
| 8,747,188 | B2 * | 6/2014 | Maloney | B24B 49/04 451/8 |
| 9,110,456 | B2 * | 8/2015 | Zhang | G05B 19/19 |
| 10,131,033 | B2 * | 11/2018 | Maloney | B24B 29/00 |
| 10,478,935 | B2 * | 11/2019 | Gu | B25J 9/1697 |
| 11,338,446 | B2 * | 5/2022 | Matsuo | B25J 11/0055 |
| 2002/0072297 | A1 * | 6/2002 | Kennerknecht | B24B 27/0038 451/5 |
| 2004/0098162 | A1 * | 5/2004 | McGuire | B44D 3/16 700/159 |
| 2004/0122547 | A1 * | 6/2004 | Seymour | A24C 5/005 700/110 |
| 2005/0043837 | A1 * | 2/2005 | Rubbert | A61C 7/00 700/118 |
| 2006/0048364 | A1 * | 3/2006 | Zhang | B23Q 17/0966 29/709 |
| 2012/0220194 | A1 * | 8/2012 | Maloney | B24B 37/30 451/5 |
| 2013/0203320 | A1 * | 8/2013 | Ghalambor | B24C 1/083 451/2 |
| 2014/0088746 | A1 * | 3/2014 | Maloney | G05B 19/4099 700/97 |
| 2016/0184905 | A1 * | 6/2016 | Tanaka | B23C 3/002 409/303 |
| 2016/0214143 | A1 | 7/2016 | Nagatsuka | |
| 2017/0066108 | A1 * | 3/2017 | Matsuyuki | H04B 1/3888 |
| 2018/0161952 | A1 * | 6/2018 | Gu | B24B 27/0038 |
| 2018/0259946 | A1 | 9/2018 | Kadokura | |
| 2020/0122336 | A1 * | 4/2020 | Matsuo | B25J 9/101 |

FOREIGN PATENT DOCUMENTS

| | | |
|---|---|---|
| JP | S61148528 U | 9/1986 |
| JP | S6374536 A | 4/1988 |
| JP | S63116223 U | 7/1988 |
| JP | H0317611 B2 | 3/1991 |
| JP | H05123921 A | 5/1993 |
| JP | H0663817 A | 3/1994 |
| JP | H071229 A | 1/1995 |
| JP | H07136843 A | 5/1995 |
| JP | H07246516 A | 9/1995 |
| JP | H0798287 B2 | 10/1995 |
| JP | H08187620 A | 7/1996 |
| JP | H1058285 A | 3/1998 |
| JP | 2002337099 A | 11/2002 |
| JP | 2005297167 A | 10/2005 |
| JP | 2006320907 A | 11/2006 |
| JP | 2007175840 A | 7/2007 |
| JP | 4228078 B2 | 2/2009 |
| JP | 2010240809 A | 10/2010 |
| JP | 2010260116 A | 11/2010 |
| JP | 4817843 B2 | 11/2011 |
| JP | 2016137551 A | 8/2016 |
| JP | 6294248 B2 | 3/2018 |
| JP | 2018144207 A | 9/2018 |

* cited by examiner

SURFACE FINISHING APPARATUS

CROSS-REFERENCE TO RELATED APPLICATIONS

This application is based on and claims priority to Japanese Patent Application No. 2019-185272, filed on Oct. 8, 2019, the entire content of which is incorporated herein by reference in its entirety.

FIELD OF THE INVENTION

The present invention relates to a surface finishing apparatus.

BACKGROUND OF THE INVENTION

In the related art, there is a known scraping method performed on a top plane surface or the like of a plate-like member for a bed of a machine tool or the like by attaching a scraper to a distal end of an arm of a robot or a machine tool and operating the arm. For example, see Japanese Unexamined Patent Application, Publication No. 2016-137551, Japanese Unexamined Patent Application, Publication No. 2010-240809, Japanese Unexamined Patent Application, Publication No. H07-136843, and Japanese Unexamined Patent Application, Publication No. H05-123921.

SUMMARY OF THE INVENTION

A surface finishing apparatus according to an aspect of the present disclosure includes: an arm; a tool attached to a distal end of the arm; a force sensor that detects a force applied to the tool; a visual sensor that acquires an image of a plane surface of a metal member, the plane surface being formed by processing; a storage device that stores data indicating a target state of the plane surface; and a controller that performs removing position determination process which determines, by using at least unfinished-surface image data obtained by the visual sensor and the data indicating the target state, a plurality of removing positions that are on the plane surface of the member and that are separated from each other, and arm control process which controls the arm to sequentially perform, by means of the tool, surface removal at the plurality of determined removing positions, wherein a surface inspection agent is applied to the plane surface whose image is to be acquired by the visual sensor, a metal flat surface is rubbed against the plane surface, and thereby the surface inspection agent is distributed over the plane surface in accordance with the state of the plane surface, and the controller controls, by using a detection result of the force sensor, the force applied to the tool when performing the surface removal.

DESCRIPTION OF EMBODIMENT(S) OF THE INVENTION

Figure 1:
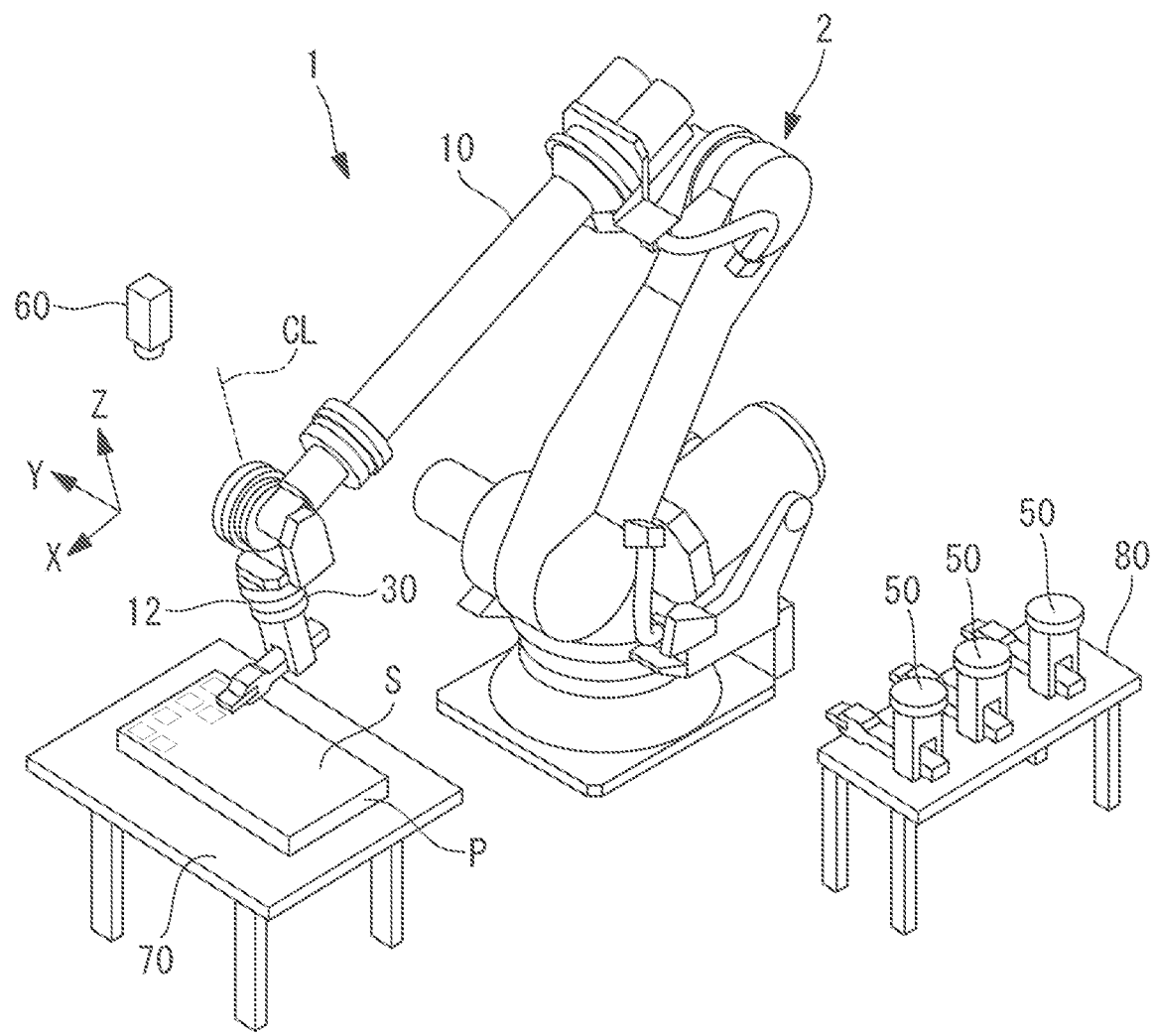
FIG. 1 is a perspective view of a surface finishing apparatus according to an embodiment of the present invention.

A surface finishing apparatus 1 according to an embodiment of the present invention will be described below with reference to the drawings.

The surface finishing apparatus 1 according to the embodiment includes a robot 2 and a controller 20 for controlling an arm 10 of the robot 2. In addition, the surface finishing apparatus 1 includes: a force sensor 30 that is attached to a distal end of the arm 10 of the robot 2; a tool 50 that is attached to the distal end of the arm 10 of the robot 2 via the force sensor 30; and a visual sensor 60.

In this embodiment, the surface finishing apparatus 1 applies surface removal at multiple locations in a plane surface S which is one of the surfaces in a thickness direction of a plate-like member P, such as the one shown in FIG. 1. The plate-like member P is employed as, for example, a bed of a machine tool. The plane surface S of the plate-like member P is subjected to precision processing, the purpose of which is to form a perfectly plane surface by means of milling, polishing, and so forth. However, even after performing such precision processing, there are many cases in which the plane surface S is moderately corrugated with irregularities of 10 μm or less or a portion of the plane surface S is slightly inclined. It is preferable that said irregularities and inclination be eliminated in order to enhance the processing precision of the machine tool.

Figure 4:
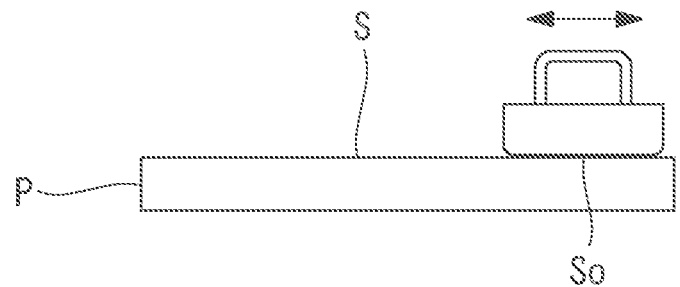
FIG. 4 is a diagram showing a state in which a metal member is rubbed against a plate-like member to be subjected to surface removal in this embodiment.

Accordingly, a flat surface $S_0$ in a metal member is conventionally rubbed against the plane surface S, as shown in FIG. 4, after a surface inspection agent is applied to nearly the entire plane surface S, and the presence/absence of the irregularities or the inclination on the plane surface S is inspected by doing so. In other words, portions at which the surface inspection agent has been removed as a result of being rubbed against the flat surface $S_0$ are portions that are protruding with respect to other portions.

For example, on the basis of the discovered irregularities or inclination, a specialist presses an instrument, which is a chisel-like instrument or an instrument having a flat-plate-like distal end, against the plurality of removing positions in the plane surface S and the specialist moves the instrument at each of the removing positions by a distance of several centimeters or less, for example, only by a distance of 2 cm or less. By doing so, the instrument scratches the respective removing positions, and thus, surface removal is performed at the respective removing positions. The surface removal is performed to remove a thickness of several micrometers, typically, 3 μm or less from the plane surface S. As a result of the surface removal, the corrugated state of the plane surface S is reduced or eliminated, which is preferable in order to enhance the processing precision of the machine tool.

On the other hand, when an attachment surface to which a ball screw bracket is attached, the plane surface S, and so forth become perfectly mirror-like plane surfaces and a gap between such a surface and a counterpart member thereof is completely eliminated, a lubrication oil is absent between the plane surface S or the attachment surface and the counterpart member. This is not preferable, because such a lack of lubrication oil becomes a cause of an operation failure such as a seizure. In order to prevent such an operation failure, for example, the specialist presses an instrument, which is a chisel-like instrument or an instrument having a flat-plate-like distal end, against a plurality of removing positions in the attachment surface, and the specialist moves the instrument at each of the removing positions by a distance of several centimeters or less, for example, by a distance of 2 cm or less. The surface removal is performed to remove a thickness of several micrometers, typically, 3 μm or less from the plane surface S. As a result of the surface removal, depressions that act as oil sumps are formed in the attachment surface, which contributes to reducing or preventing an operation failure such as a seizure.

Figure 2:
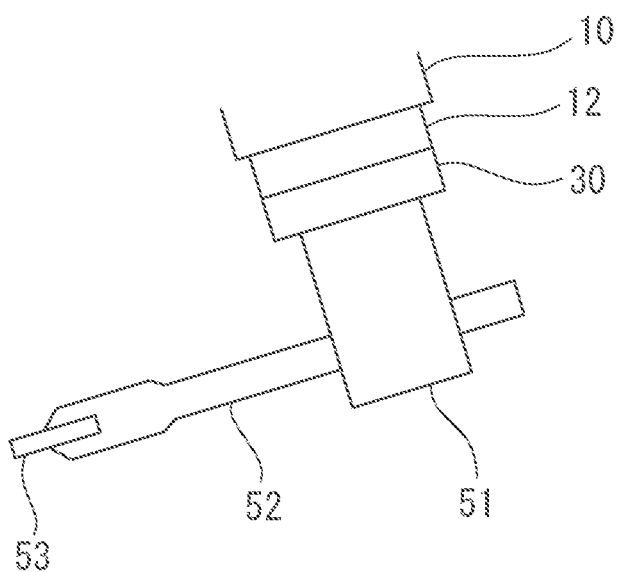
FIG. 2 is a side view of an essential portion of the surface finishing apparatus according to this embodiment.

As shown in FIG. 2, the tool 50 of this embodiment has: a fixed portion 51 that is secured to a distal-end portion of the arm 10 of the robot 2 via the force sensor 30; a plate-like extension portion 52 that extends from the fixed portion 51; and a flat-plate-like distal-end portion 53 that is fixed to a distal end of the extension portion 52. In an example, the fixed portion 51 and the extension portion 52 are formed of a metal, and the distal-end portion 53 is formed of a high-hardness steel such as tool steel. In this embodiment, the robot 2 performs the surface removal by pressing the distal-end portion 53 against the plane surface S of the plate-like member P.

Although the visual sensor 60 in this embodiment is a 2D camera, it is possible to employ a 3D camera.

The arm 10 of the robot 2 includes a plurality of arm members and a plurality of joints. In addition, the arm 10 includes a plurality of servomotors 11 that individually drive the plurality of joints (see FIG. 3). Various types of servomotors, such as rotary motors or linear motors, could be employed as the respective servomotors 11. The individual servomotors 11 have operating-position detecting devices for detecting the operating positions and operating speeds thereof, and an encoder is an example of the operating-position detecting device. The detection values of the operating-position detecting devices are transmitted to the controller 20.

The force sensor 30 is a well-known 6-axis force sensor. The force sensor 30 is fixed to a wrist flange 12 of the arm 10, as shown in FIG. 1. In addition, the direction in which the Z-axis of the force sensor 30 extends is parallel to the direction in which the center axis CL of the wrist flange 12 of the arm 10 extends. In this embodiment, the center axis of the force sensor 30 is aligned with the center axis CL of the wrist flange 12. In the description below, an X-axis direction, a Y-axis direction, and a Z-axis direction of the force sensor 30 shown in FIG. 1 will be referred to simply as the X-axis direction, the Y-axis direction, and the Z-axis direction in some cases.

The force sensor 30 detects a Z-axis-direction force, an X-axis-direction force, and a Y-axis-direction force that act on the tool 50. In addition, the force sensor 30 also detects a torque about the Z-axis, a torque about the X-axis, and a torque about the Y-axis that act on the tool 50. In this embodiment, a 6-axis sensor is employed as the force sensor 30; however, it is also possible to employ a 3-axis force sensor, a 2-axis force sensor, a 1-axis force sensor, or the like.

Figure 3:
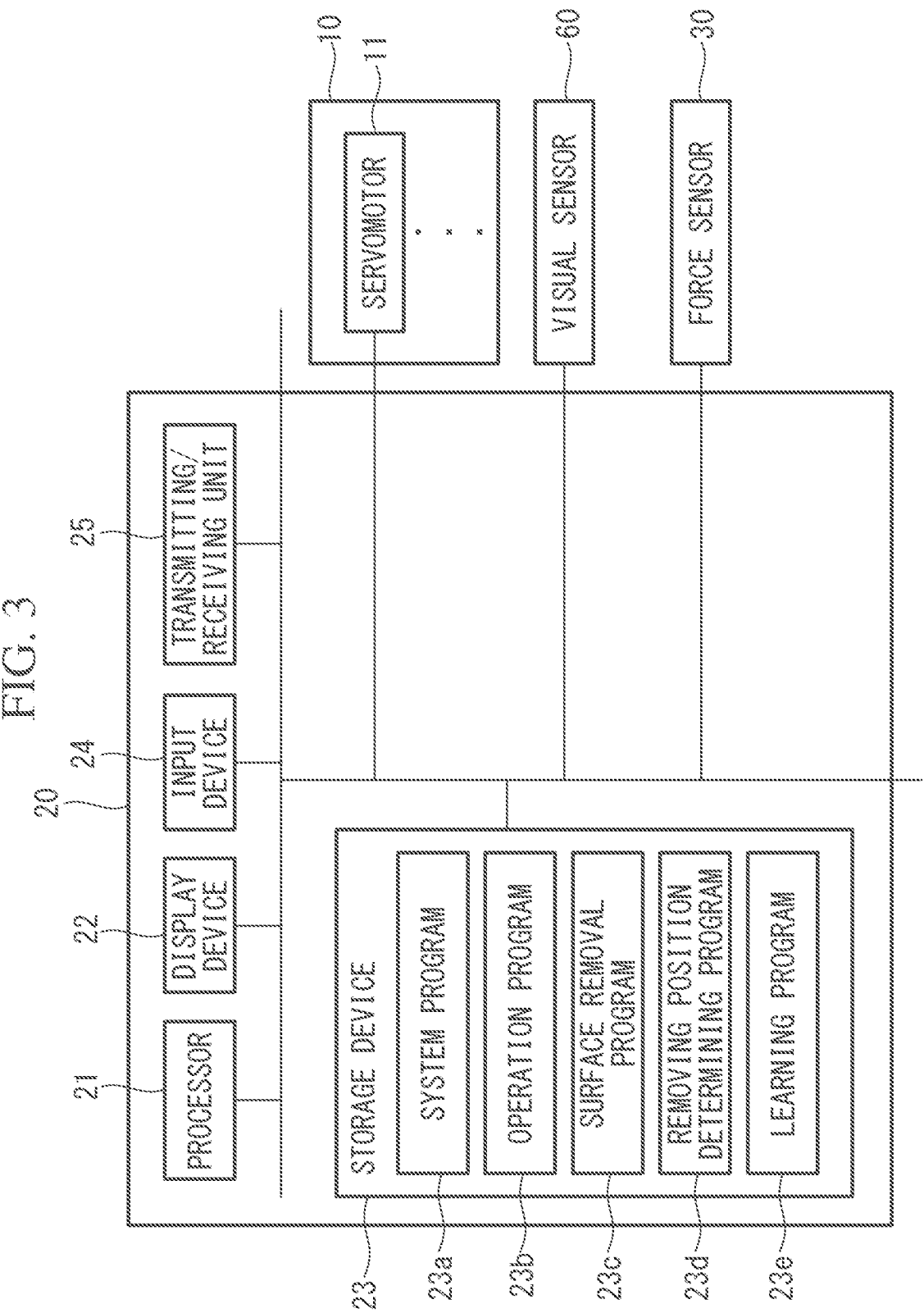
FIG. 3 is a block diagram of a controller of a robot of the surface finishing apparatus according to this embodiment.

As shown in FIG. 3, the controller 20 includes: a processor 21 such as a CPU; a display device 22; a storage device 23 having a non-volatile storage, a ROM, a RAM, and so forth; an input device 24, which is a keyboard, a touch screen, an operation panel, or the like; and a transmitting/receiving unit 25 for transmitting/receiving signals. The input device 24 and the transmitting/receiving unit 25 serve as input units. The controller 20 is connected to the force sensor 30 and the respective servomotors 11.

In this embodiment, the controller 20 is a robot controller provided in the robot 2. However, the controller 20 may be a computer that is provided in the robot controller or outside the robot controller and that has the above-described configuration.

The storage device 23 stores a system program 23a, and the system program 23a handles basic functions of the controller 20. The storage device 23 also stores an operation program 23b. The operation program 23b is created based on a reference coordinate system of the robot 2 and is for sequentially disposing, in the reference coordinate system, the tool 50 attached to the distal-end portion of the arm 10 at a plurality of removing positions and orientations.

The storage device 23 also stores a surface removal program 23c. The surface removal program 23c causes the tool 50 disposed at each of the removing positions to be pushed by a prescribed distance, for example, a distance of several centimeters or less (in this embodiment, a distance of 2 cm or less) while using force control and, by doing so, the surface removal program 23c causes the tool 50 to scratch the plane surface S at each of the removing positions.

The storage device 23 also stores a removing position determining program 23d. The removing position determining program 23d applies image processing to acquired image data of the visual sensor 60 and determines the plurality of removing positions in the processed image.

The storage device 23 also stores a learning program 23e. In this embodiment, the controller 20, which operates on the basis of the learning program 23e, serves as a learning unit; however, another computer may serve as a learning unit on the basis of the learning program 23e.

Figure 6:
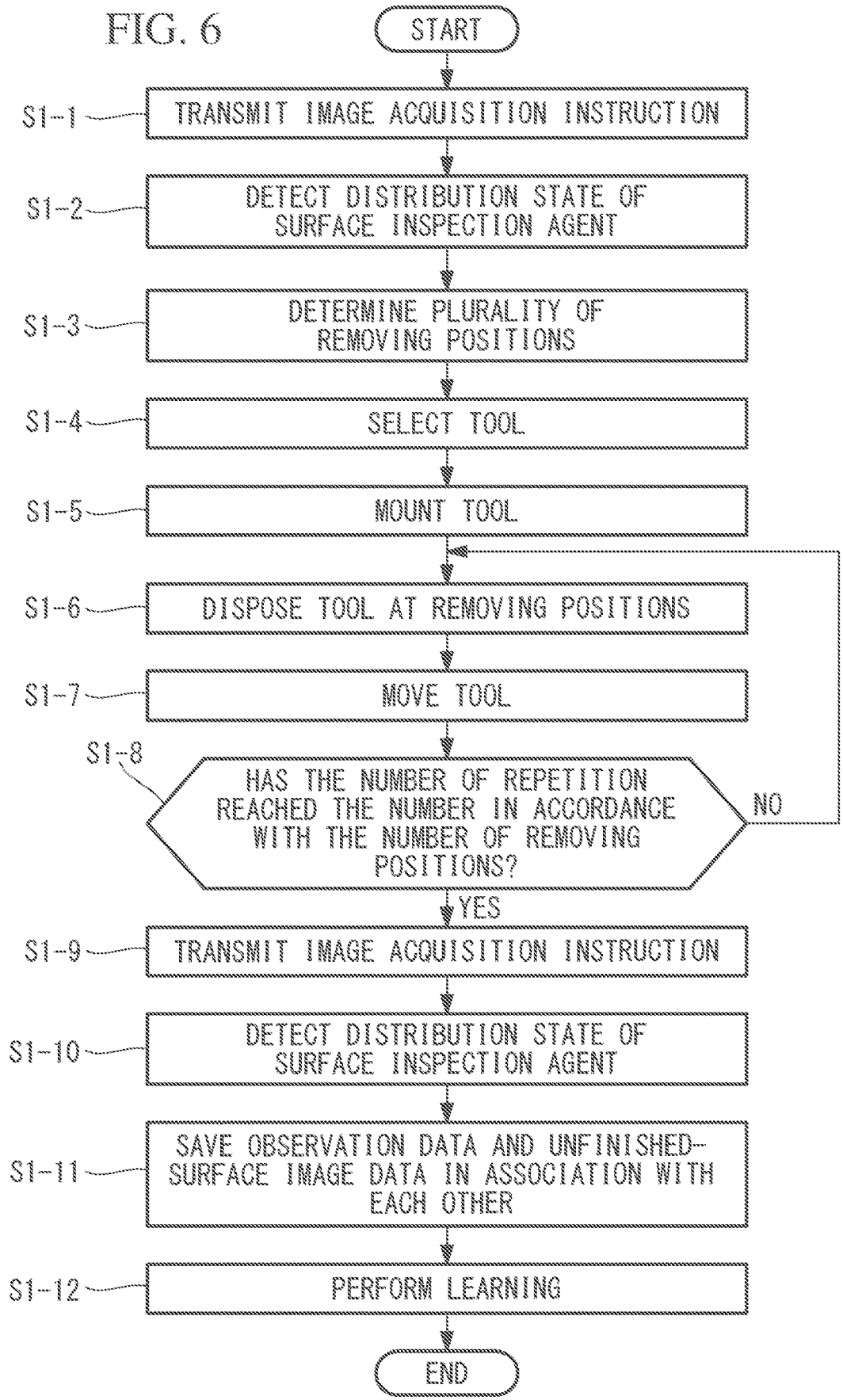
FIG. 6 shows a flowchart showing an example of processing performed by the controller of the robot according to this embodiment.

The controller 20 performs, for example, processing explained below on the basis of the operation program 23b, the surface removal program 23c, the removing position determining program 23d, and the learning program 23e (FIG. 6).

First, in the state in which the plate-like member P is mounted or secured on a prescribed mounting portion 70, the controller 20 transmits the image acquisition instruction to the visual sensor 60 on the basis of the removing position determining program 23d (step S1-1). Accordingly, the controller 20 receives the unfinished-surface acquired image data obtained by the visual sensor 60. In this embodiment, the entire plane surface S of the plate-like member P is in the viewing field of the visual sensor 60. In the case in which only a portion of the plane surface S of the plate-like member P is in the viewing field of the visual sensor 60, the controller 20 causes the visual sensor 60 to acquire an image of the entire plane surface S of the plate-like member P while moving the visual sensor 60. In this case, the visual sensor 60 can be moved by means of a moving means of the arm 10 or the like of the robot 2.

Note that the surface inspection agent is applied to the plane surface S before performing the image acquisition by means of the visual sensor 60, and, subsequently, a flat surface $S_0$ of the metal member is rubbed against the plane surface S, as shown in FIG. 4. This work is referred to as inspection preparation in this embodiment. As a result of the rubbing, the surface inspection agent is removed from portions (high portions) protruding farther than other parts in the plane surface S. Colored powder is an example of the surface inspection agent, and such powder is referred to as a red lead primer.

Figure 5:
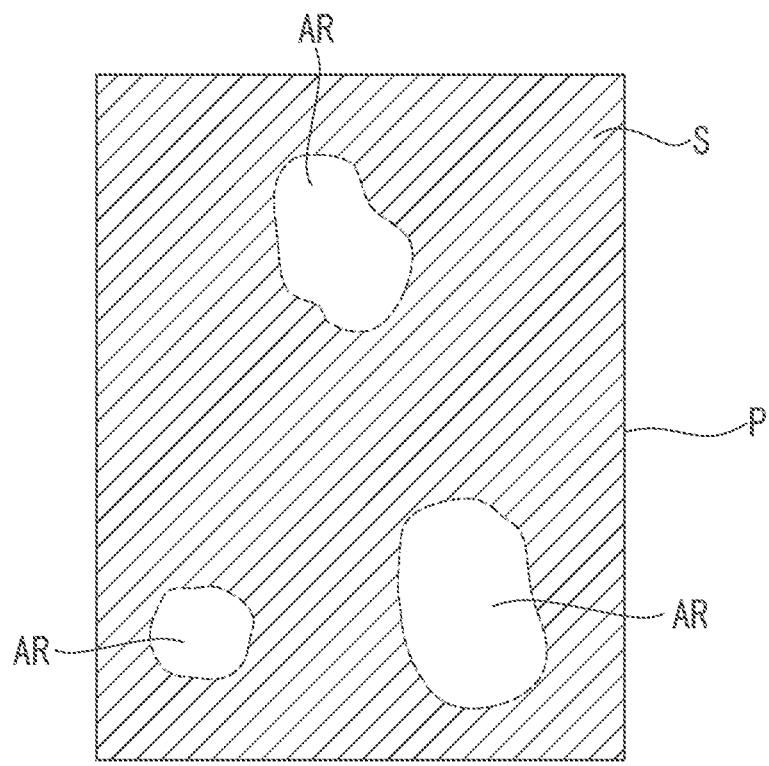
FIG. 5 shows an example of unfinished-surface image data related to a surface of the plate-like member to be subjected to the surface removal in this embodiment.

Next, the controller 20 applies image processing, as needed, to the obtained unfinished-surface image data on the basis of the removing position determining program 23d, and detects a distribution state of the surface inspection agent in the processed image (step S1-2). For example, as shown in FIG. 5, areas AR in which the surface inspection agent is absent in the plane surface S of the plate-like member P are detected. Note that multiple types of areas may be detected in the plane surface S in accordance with the color concentration due to the surface inspection agent. In this case, in the plane surface S, a first area in which the color is lighter than a first color, a second area in which the color is lighter than a second color that is deeper than the first color, and so forth are detected. Note that an image that indicates the distribution state obtained in step S1-2 is also a form of the unfinished-surface image data.

Figure 7:
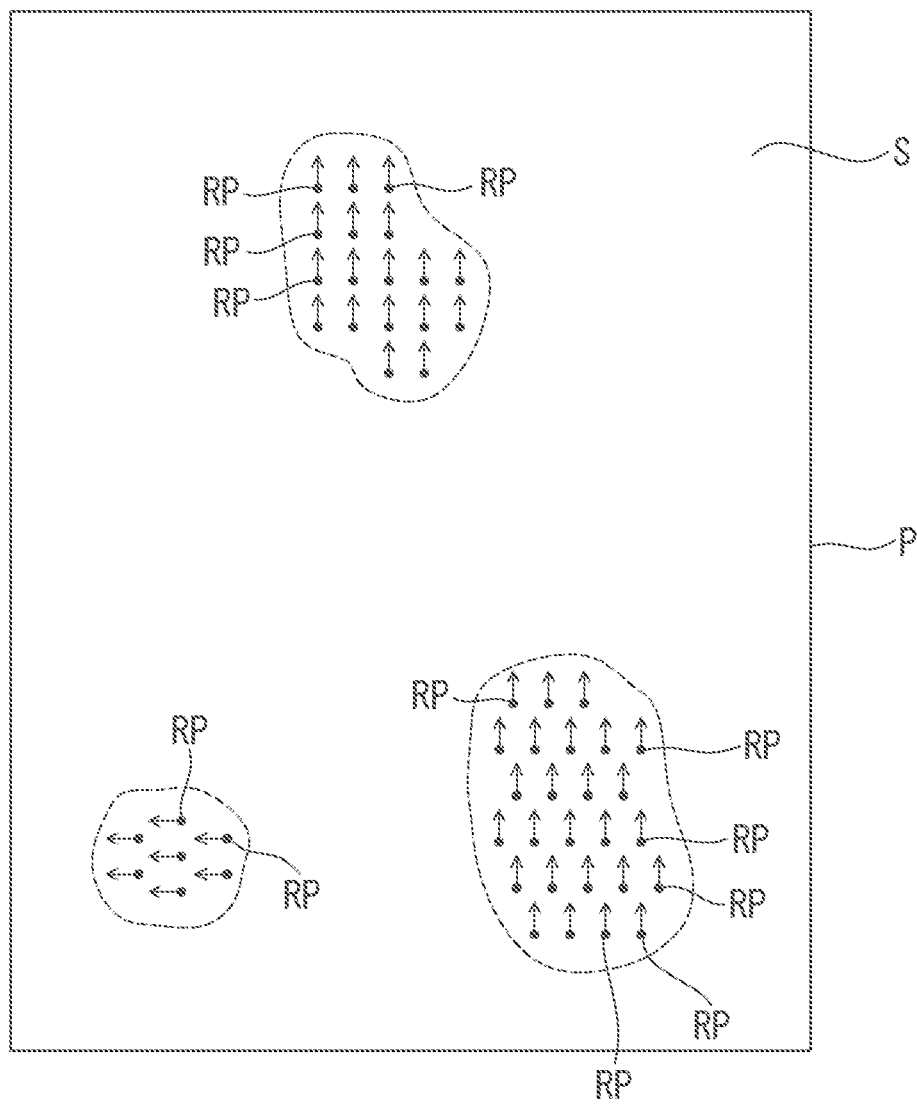
FIG. 7 is a diagram showing examples of removing positions determined in this embodiment.

Next, the controller 20 operates according to the removing position determining program 23d and determines a plurality of removing positions RP to be subjected to the surface removal, as shown in FIG. 7, on the basis of the distributions of the areas AR, the first areas, the second areas, and so forth in the plane surface S (S1-3). The plurality of removing positions RP are separated from each other. In addition, at this time, the controller 20 determines the removal directions of the respective removing positions RP as indicated by arrows in FIG. 7. Note that, when the removal directions are fixed, the controller 20 does not determine the removal directions.

Note that a plurality of finished-surface image data may be stored in the storage device 23 of the controller 20, the finished-surface image data being obtained by means of the visual sensor 60 or another visual sensor by acquiring images of the state of the plane surfaces S after applying the surface removal thereto. In this embodiment, the plurality of finished-surface image data relate to the plane surfaces S of the same type as the plate-like members P; however, said data may relate to plane surfaces of different types of plate-like members, or the data may relate to plane surfaces of other members. In addition, the plurality of finished-surface image data are stored with regard to the plane surfaces S that are in a good or appropriate state that is ready for use.

In addition, in the case in which a plurality of plate-like members P are manufactured, distributions of the areas AR, the first areas, the second areas, and so forth in the plane surfaces S differ from each other in the plurality of plate-like members P. Accordingly, the plurality of finished-surface image data differ from each other in terms of the positions and numbers of sites at which the surface removal is applied.

When performing step S1-3, the controller 20 determines the plurality of removing positions RP to be subjected to the surface removal by using, among the plurality of finished-surface image data (data indicating the target state), finished-surface image data that conform to the distribution state of the surface inspection agent detected in step S1-2. The plurality of finished-surface image data may individually possess data related to the distribution state of the surface inspection agent before performing the surface removal. In this case, the removing positions RP are more accurately determined.

When performing step S1-3, as the data indicating the target state, an operator may input the targets to the input device 24. In an example, the operator inputs a purpose of the surface removal, as a first target. In addition, the operator inputs, as a second target, a percentage of the occupied area by the areas AR in the plane surface S, when the inspection preparation is applied to the plane surface S after the surface removal and images of the plane surface S is acquired by means of the visual sensor 60. In addition, the operator inputs, as a third target, areas to be focused on when performing the surface removal. For example, when portions of the plane surface S, such as an upper half of the plane surface S, an intermediate portion thereof in a top-to-bottom direction, and so forth in FIG. 5, are to be focused on when performing the surface removal, inputs are made to specify areas of said portions. The first target is not necessary in the case in which the purpose of the surface removal is fixed in the surface finishing apparatus 1. The first to third targets are stored in the storage device 23.

When performing step S1-3, the controller 20 may determine the plurality of removing positions RP to be subjected to the surface removal by using one of the plurality of finished-surface image data, the first target, the second target, and the third target or a combination thereof.

Next, the controller 20 selects the specific tool 50 to be used on the basis of the surface removal program 23c (step S1-4). The surface finishing apparatus 1 includes a tool storage unit 80, such as a tool stand, a tool cartridge, or the like, and a plurality of tools 50 are stored in the tool storage unit 80. The plurality of tools 50 differ from each other in terms of the shapes, the materials, and so forth of the distal-end portions 53 thereof. When determining the type of the tool 50 in step S1-4, the controller 20 uses, for example, one of the plurality of finished-surface image data, the first target, the second target, and the third target or a combination thereof, as well as the distribution state of the surface inspection agent obtained in step S1-2 on the basis of the unfinished-surface image data.

Next, the controller 20 controls the arm 10 of the robot 2 in order to mount, to the robot 2, the tool 50 selected in step S1-4 on the basis of the surface removal program 23c (step S1-5). In order to perform this mounting, in this embodiment, a male component of a publicly known automatic tool changer is fixed to the wrist flange 12 of the arm 10, and a female component of the automatic tool changer is fixed to the fixed portion 51 of each tool 50.

Next, the controller 20 controls the arm 10 in order to sequentially dispose the distal end of the tool 50 at the plurality of removing positions RP determined in step S1-3 on the basis of the operation program 23b (step S1-6). At this time, the controller 20 uses the detection results of the force sensor 30 to detect that the distal end of the tool 50 is in contact with the plane surface S at each removing position RP, and determines that the tool 50 is disposed at each removing position RP when the contact is detected. In step S1-6, the controller 20 controls the orientation of the distal-end portion of the arm 10 in order to point the distal end of the tool 50 in the direction indicated by the arrows in FIG. 7.

Next, the controller 20 makes the tool 50 move, by a distance of 2 cm or less, in the direction in which the distal end thereof is pointed while controlling the force applied to the tool 50 by using the detection results of the force sensor 30 on the basis of the surface removal program 23c (step S1-7). In step S1-7, the controller 20 may control the moving speed at which the tool 50 is moved. For example, the controller 20 controls the moving speed of the tool 50 so as to fall within a prescribed speed range.

The controller 20 repeats steps S1-6 and S1-7 by a number of times in accordance with the number of removing positions RP (step S1-8), and, subsequently, the controller 20 transmits the image acquisition instruction to the visual sensor 60 on the basis of the inputs to the input device 24 or the like (step S1-9). The inspection preparation has been applied to the plane surface S before the input is made to the input device 24.

In addition, the controller 20 applies, as needed, image processing to the acquired image data (observation data) obtained in step S1-9, and detects the distribution state of the surface inspection agent in the processed image (step S1-10). The image indicating the distribution state, obtained in step S1-10, is also an example of the observation data. Note that the image indicating the distribution state, obtained in step S1-10, is employed as the finished-surface image data in the next surface removal and thereafter. The processing performed by the controller 20 in step S1-10 is the same as the processing in step S1-2. Note that the controller 20 can evaluate, by using the observation data obtained in step S1-10, the flatness of the plane surface S that has been subjected to the surface removal.

Figure 8:
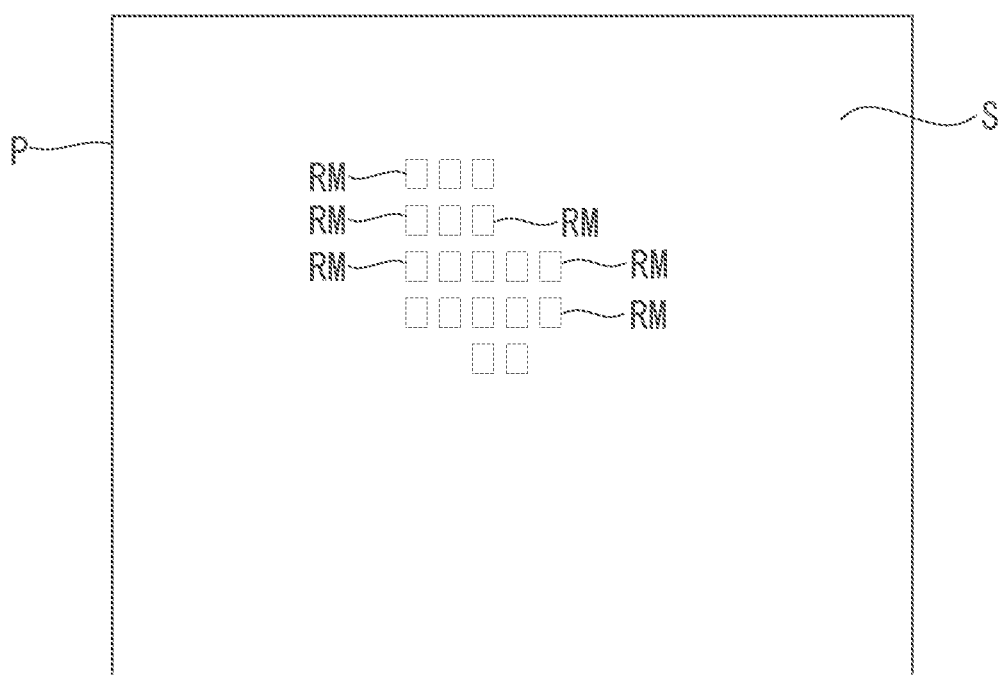
FIG. 8 shows example observation data related to the surface of the plate-like member subjected to the surface removal in this embodiment.

FIG. 8 shows an example of the plane surface S to which the surface removal has been applied. The surface inspection agent tends to accumulate in surface removal marks RM formed as a result of performing the surface removal at the respective removing positions RP. Accordingly, in step S1-10, it is also possible for the controller 20 to detect the distribution state of the surface inspection agent by ignoring the surface inspection agent in the surface removal marks RM.

Note that the surface removal marks RM are separated from each other in FIG. 8; however, the surface removal marks RM may overlap with each other.

The controller 20 saves, in the storage device 23, the image of the distribution state of the surface inspection agent, which is obtained as the unfinished-surface image data in step S1-2, and the image of the distribution state of the surface inspection agent, which is obtained as the observation data in step S1-10, in a state in which the two images are associated with each other (step S1-11). The saved observation data are used as the finished-surface image data in step S1-3 in the next surface removal and thereafter.

The controller 20 operates in accordance with the learning program 23*e* and performs learning for determining the plurality of removing positions RP in step S1-3 when performing the next surface removal (step S1-12). At this time, the controller 20 uses the unfinished-surface image data and the observation data stored in the storage device 23, as well as one of the plurality of finished-surface image data, the first target, the second target, and the third target or a combination thereof. One of the plurality of finished-surface image data, the first target, the second target, and the third target or a combination thereof is data indicating the target states, as described above.

For example, the distribution state of the surface inspection agent in the observation data is evaluated with respect to the data indicating the target state. For example, in the case in which the small area AR in a lower left portion of FIG. 5 has sufficiently expanded as a result of the surface removal, but the large areas AR in upper and lower right portions of FIG. 5 have not sufficiently expanded as a result of the surface removal, the surface removal is evaluated to be insufficient regarding the large areas AR in the upper and lower right portions. In the case in which said evaluation is made, the controller 20 increases, as a result of learning, the number of removing positions RP in the case in which the area AR is large and/or increases the area in which the removing positions RP are disposed. In order to obtain said learning result, separation distances among the areas AR are also taken into consideration. In addition, the shapes of the respective areas AR, the positions of the respective areas AR, the depth of color of the surface inspection agent in the areas surrounding the respective areas AR, and so forth could also be taken into consideration.

Note that, in step S1-12, the controller 20 may simply evaluate the distribution state of the surface inspection agent in the observation data.

Note that the controller 20 can also operate in accordance with the learning program 23*e* and perform, by using the unfinished-surface image data and the observation data, learning for optimizing the force applied to the tool when performing the surface removal. In the observation data, there are cases in which large quantities of the surface inspection agent have accumulated in end portions of the surface removal marks RM. Large differences in level formed in said end portions act as one cause of large quantities of the surface inspection agent accumulating in the end portions of the surface removal marks RM in this way. The differences in level relate to the amount to be shaved off in the surface removal.

Accordingly, as an example of the optimization, the controller 20 can increase or reduce, by using the unfinished-surface image data and the observation data, the force applied to the tool 50 when performing the surface removal.

Note that, in step S1-12, it is also possible to estimate the sizes of the differences in level on the basis of the accumulated amounts of the surface inspection agent and to evaluate whether or not the individual marks of surface removal (surface removal marks RM) are appropriate by using the estimation results.

In addition, the controller 20 also can operate in accordance with the learning program 23*e* and perform, by using the unfinished-surface image data and the observation data, learning for optimizing the moving speed of the tool 50 when performing the surface removal. A slow moving speed of the tool 50 is one conceivable cause of an increase in the sizes of the differences in level. Accordingly, as an example of the optimization, the controller 20 can increase or reduce, by using the unfinished-surface image data and the observation data, the speed by which the tool 50 is moved when performing the surface removal.

In addition, the controller 20 also can operate in accordance with the learning program 23*e* and perform, by using the unfinished-surface image data and the observation data, learning about optimal tools 50 in accordance with the situation. There are cases in which the tool 50 used in the current round of surface removal being inappropriate for the plane surface S is one of the causes of an increase in the sizes of the differences in level. For example, there are cases in which the sizes of the differences in level tend to increase excessively, and thus, there are cases in which the surface removal marks RM have unintended shapes. Such situations may be result from the influence of the processing roughness or the like of the plane surface S. The processing roughness of the plane surface S changes due to deterioration or the like of an instrument used to process the plane surface S or an instrument used to polish the plane surface S. In addition, the directions in which processing marks extend differ depending on the location of the plane surface S. Because these surface states are manifested in the unfinished-surface image data, the controller 20 can learn whether or not the tool 50 is appropriate with respect to the surface states shown in the unfinished-surface image data of the current round.

Note that the operator can input information about the observation data from the input device 24. For example, the operator is a scraping specialist or a person having sufficient experience and knowledge about scraping and can accurately evaluate the state of the plane surface S after scraping. The operator inputs, to the input device 24, an acceptable/ unacceptable determination, reasons for unacceptable cases, and so forth regarding the observation data obtained in step S1-10. The controller 20 saves the input information about the observation data and said observation data in association with each other in the storage device 23. The information about the observation data are examples of learning data and are employed in learning about the number and the positions of the removing positions RP, learning about the force to be applied to the tool 50, and learning about the moving speed of the tool 50.

Note that the finished-surface image data of the plane surface S processed by a scraping specialist may be included in the plurality of finished-surface image data stored in the storage device 23.

In this embodiment, by using the unfinished-surface image data obtained by the visual sensor 60 and the data indicating the target states, such as the first target, the plurality of removing positions RP in the plane surface S are determined, and the surface removal is sequentially performed at the plurality of removing positions RP by means of the tool 50 at the distal end of the arm 10. In addition, by using the detection results of the force sensor 30, the controller 20 controls the force applied to the tool 50 when performing the surface removal.

With this configuration, because the positions at which the surface removal will be performed are automatically determined, it is possible to determine the positions at which the surface removal will be performed even if a person who is familiar with said processing, such as a scraping specialist, is not present. In addition, because the force applied to the tool 50 is controlled, it is possible to accurately perform the surface removal at, for example, a depth of 3 µm or less.

In addition, in this embodiment, whether or not the state of the plane surface S is appropriate after performing the surface removal and/or whether or not the states of the surface removal marks RM are appropriate after performing the surface removal are determined on the basis of the observation data. Accordingly, it is possible to determine whether or not the plane surface S after the surface removal is usable, even if a person who is familiar with said processing, such as a scraping specialist, is not present.

In addition, in this embodiment, the observation data are image data obtained by acquiring, by means of the visual sensor 60 or another visual sensor, images of the plane surfaces S after being subjected to the surface removal. As has been described above, the states of the plane surfaces S of the plurality of plate-like members P differ from each other, and the distributions and numbers of the removing positions RP also differ in the respective plate-like members P. In other words, even if there are two plane surfaces S in which the total surface areas of the areas AR after the surface removal are the same, the shapes, the numbers, and so forth of the areas AR that appear in the two plane surfaces S are different from each other. Accordingly, using the image data of the plane surfaces S after being subjected to the surface removal as the observation data results in accurate determination of the states of the plane surfaces S after being subjected to the surface removal.

Note that the observation data may be data obtained by measuring the surface shapes of the plane surfaces S by means of a surface roughness measurement or the like.

In addition, in this embodiment, learning for determining the plurality of removing positions RP is performed by using at least the unfinished-surface image data, the data indicating the target states, and the observation data as the learning data. For example, using distribution states of the surface inspection agent in the plane surfaces S after being subjected to the surface removal as the observation data makes it possible to determine, during the learning, specific portions of the plane surfaces S in which there is an excess/lack of the surface removal.

In addition, as described above, the states of the plane surfaces S of the plurality of plate-like members P differ from each other, and the distributions and numbers of the removing positions RP also differ in the respective plate-like members P. Because of this, it is not possible to achieve uniform flatnesses in the plane surfaces S of the plurality of plate-like members P even if the same surface removal is applied to the same locations. In addition, it is not possible for the scraping specialists to accurately communicate knowledge and senses possessed by the scraping specialists themselves to other people. One of the causes that create such a situation is that techniques and senses to be applied differ for the respective plate-like members P, and thus, scraping tools differ for the respective specialists. Using, as the learning data for machine learning, the distribution states of the surface inspection agent in the plane surfaces S after the surface removal makes it possible for the controller 20 to obtain, by repeating the learning, data corresponding to the knowledge and the senses that the scraping specialists possess. This is extremely useful in order to make it possible to process, by means of a machine, regions in which the limit of processing precision of a machine is exceeded and where conventionally it has been necessary to rely on the techniques of the specialists.

In addition, in this embodiment, learning for optimizing the force to be applied to the tool 50 when performing the surface removal is performed by using at least the unfinished-surface image data and the observation data as the learning data. As described above, it is not possible for the scraping specialists to accurately communicate knowledge and senses possessed by the scraping specialists themselves to other people. Whether or not the surface removal marks RM are appropriate differs depending on the locations at which the surface removal is performed; for example, the surface removal needs to be applied more to portions that are much higher than the other portions, and the surface removal needs to be applied less to portions that are slightly higher than the other portions. It is difficult to express such adjustments by numerical values, and this is also one of the causes that create the above-described situation.

For example, using, as the learning data, the unfinished-surface image data and the distribution states of the surface inspection agent in the plane surfaces S after the surface removal makes it possible for the controller 20 to obtain, by repeating the learning, data corresponding to the knowledge and the senses that the scraping specialists possess.

Similarly, in this embodiment, learning for optimizing the moving speed of the tool 50 when performing the surface removal is performed by using at least the unfinished-surface image data and the observation data as the learning data. With regard to the moving speed also, it is possible for the controller 20 to obtain, by repeating the learning, data corresponding to the knowledge and the senses possessed by the scraping specialists, as with the case of the force to be applied to the tool 50.

In this embodiment, the controller 20 selects the tool 50 to be attached to the distal end of the arm 10 by using at least the unfinished-surface image data and the data indicating the target states. Because the extension portion 52 of the tool 50 has a relatively long, thin shape and the distal-end portion 53 is relatively thin, a portion of the tool 50 sometimes slightly warps when performing the surface removal. There are cases in which this warping is also necessary to accurately perform the surface removal, and the warping properties differ in the respective tools 50. Note that other properties also differ in the respective tools 50.

The configuration in which the tool 50 is automatically selected, as described above, makes it possible to determine the positions at which the surface removal will be performed even if a person who is familiar with said processing, such as a scraping specialist, is not present.

Note that another computer may perform the learning. For example, a host computer connected to a plurality of controllers 20 may store the learning program 23e. In this case, the unfinished-surface image data, the observation data, the finished-surface image data, data related to operation of the arms 10 when performing the surface removal, and so forth are transmitted to the host computer from the controllers 20, and the host computer performs the above-described learning by using the received data.

In addition, instead of the tool 50 being attached to the arm 10 of the robot 2, the tool 50 may be attached to an arm of a processing tool. In this case also, operational effects that are similar to those described above are afforded.

The invention claimed is:

1. A surface finishing apparatus comprising:
   an arm;
   a tool attached to a distal end of the arm;
   a force sensor that detects a force applied to the tool;
   a visual sensor that acquires an image of a plane surface of a metal member, the plane surface being formed by processing;
   a storage device that stores data indicating a target state of the plane surface; and
   a controller that performs removing position determination process which determines, by using at least unfinished-surface image data obtained by the visual sensor and the data indicating the target state, a plurality of removing positions that are on the plane surface of the member and that are separated from each other, and arm control process which controls the arm to sequentially perform, by means of the tool, surface removal at the plurality of determined removing positions,
   wherein a surface inspection agent is applied to the plane surface whose image is to be acquired by the visual sensor, a metal flat surface is rubbed against the plane surface, and thereby the surface inspection agent is distributed over the plane surface in accordance with the state of the plane surface, and
   the controller controls, by using a detection result of the force sensor, the force applied to the tool when performing the surface removal.

2. The surface finishing apparatus according to claim 1, wherein at least one of whether or not the plane surface to which the surface removal has been performed is in an appropriate state and whether or not a mark formed as a result of the surface removal is in an appropriate state is determined based on observation data of a state of the plane surface on which the surface removal has been performed by means of the tool.

3. The surface finishing apparatus according to claim 2, wherein the observation data is image data obtained by acquiring, by means of the visual sensor or another visual sensor, an image of the plane surface to which the surface removal has been performed.

4. The surface finishing apparatus according to claim 2, further comprising a learning unit that performs learning for determining the plurality of removing positions by using, as learning data, at least the unfinished-surface image data, the data indicating the target state, and the observation data.

5. The surface finishing apparatus according to claim 2, further comprising a learning unit that performs learning for optimizing the force to be applied to the tool when performing the surface removal by using, as learning data, at least the unfinished-surface image data and the observation data.

6. The surface finishing apparatus according to claim 2, further comprising a learning unit that performs learning for optimizing a moving speed of the tool when performing the surface removal by using, as learning data, at least the unfinished-surface image data and the observation data.

7. The surface finishing apparatus according to claim 1, further comprising a tool storage that holds a plurality of tools,
   wherein the controller performs, by using at least the unfinished-surface image data and the data indicating the target state, tool selecting process for selecting a tool to be attached to the distal end of the arm and tool exchanging process for controlling the arm in order to attach the selected tool to the distal end of the arm.

\* \* \* \* \*